Aug. 28, 1962 H. R. KILLIAN 3,050,781
MOLDED IN PLACE RUBBER SEAT BUTTERFLY VALVE
Filed Aug. 28, 1959 5 Sheets-Sheet 1

Inventor:
Henry R. Killian
By: Hofgren, Brady, Wegner,
Allen & Stellman
Attorneys Aug. 28, 1962 H. R. KILLIAN 3,050,781
MOLDED IN PLACE RUBBER SEAT BUTTERFLY VALVE
Filed Aug. 28, 1959 5 Sheets-Sheet 2
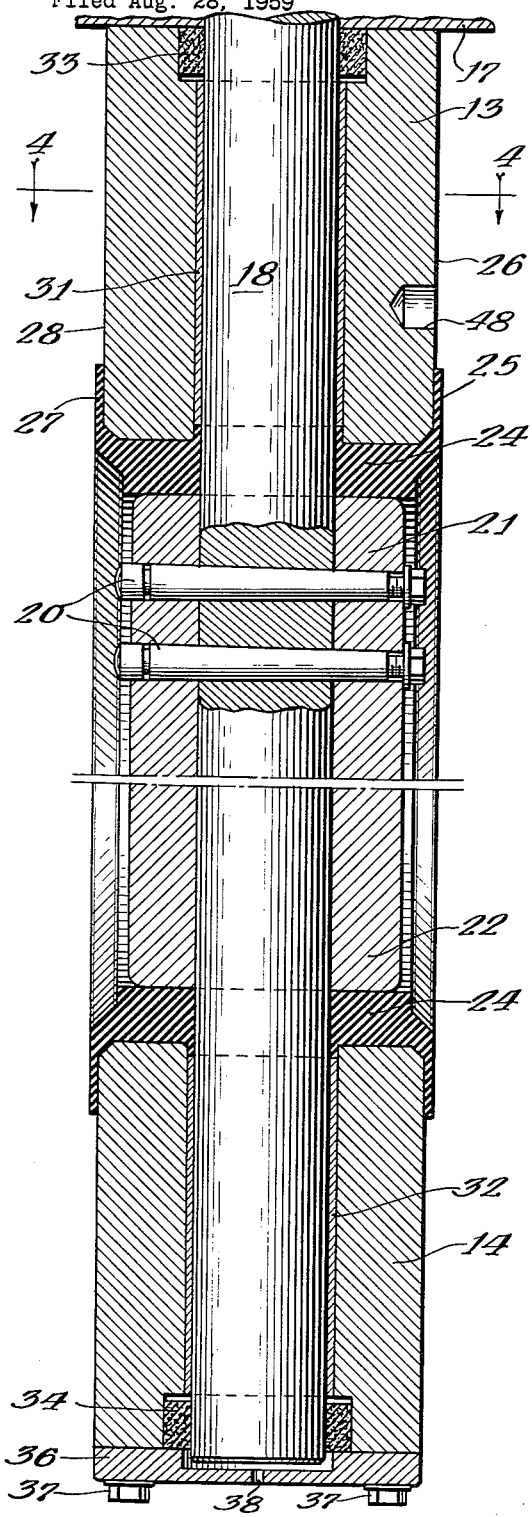
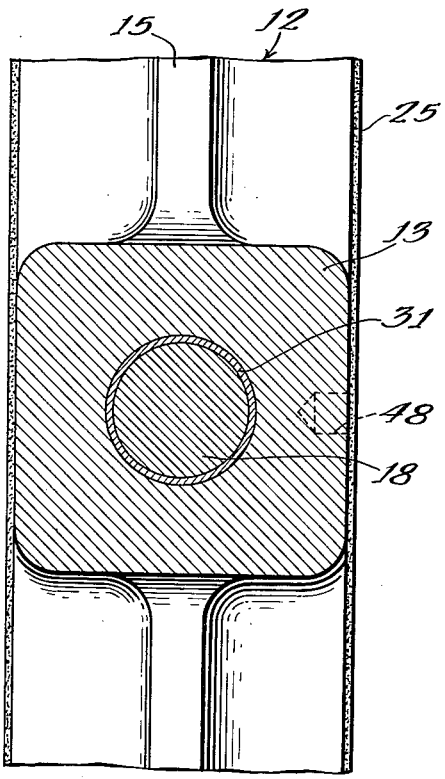
Inventor:
Henry R. Killian
By: Hofgren, Brady, Wegner,
Allen & Stellman
Attorneys Aug. 28, 1962  H. R. KILLIAN  3,050,781
MOLDED IN PLACE RUBBER SEAT BUTTERFLY VALVE
Filed Aug. 28, 1959  5 Sheets-Sheet 3

Inventor:
Henry R. Killian
By Hofgren, Brady, Wegner,
Allen & Stellman
Attorneys

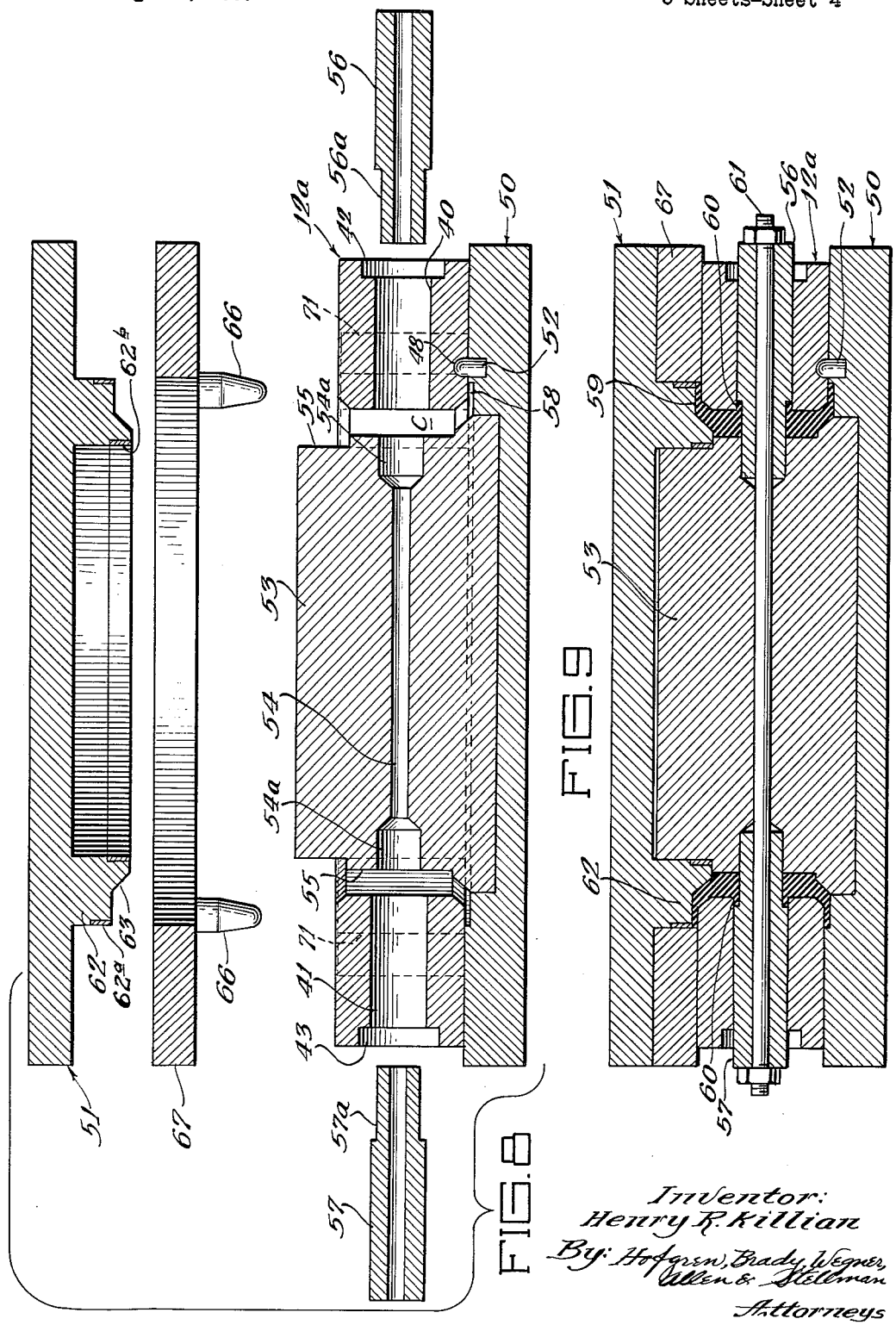

United States Patent Office 3,050,781
Patented Aug. 28, 1962

3,050,781
MOLDED IN PLACE RUBBER SEAT BUTTERFLY VALVE
Henry R. Killian, Park Forest, Ill., assignor to Henry Pratt Company, a corporation of Illinois
Filed Aug. 28, 1959, Ser. No. 836,710
9 Claims. (Cl. 18—36)

This invention relates to valve structures and more particularly to the method of manufacturing a butterfly valve having a resilient seat for the valve disc, and a new and improved butterfly valve structure.

Water distribution systems throughout the United States use a great many valves. Many valves are used only for the purpose of closing off a section of distribution water main in order to make repairs or to attach additional lines to the main. Such valves are generally buried in the ground and may be operated only occasionally, sometimes years passing between the times the valve is operated. In other installations, the valves may be operated daily such as in water filtration plants. These valves have traditionally been gate valves primarily because butterfly valves have not been competitively priced. It is believed that the cost of making butterfly valves, has in the past been significantly higher than the cost of making gate valves, a situation which is reversed with the present invention.

It is the primary object of this invention to make a new and improved butterfly valve structure and to provide novel steps for manufacturing the valve.

Another object of the present invention is to provide means for substantially lowering the cost of manufacturing butterfly valve structures.

Another object of the invention is to provide a novel valve structure having a resilient seat for the valve closure disc, which seat may have an increased life and effectiveness throughout the life of the valve.

A further object is to provide novel methods of manufacturing valves of the character described whereby tolerances on certain parts may be relaxed yet a more accurately formed valve will result from following the method providing advantages of lower torque for operating and more uniformity in the seat of the valve both as to thickness and durometer.

Other objects, features and advantages of the present invention will be apparent from the following description of the method and a preferred embodiment of the valve of this invention illustrated in the accompanying drawings, in which:

FIGURE 3 is a vertical sectional view through the valve partially broken away and enlarged, and taken substantially along the line 3—3 in FIGURE 1;

FIGURE 4 is a horizontal sectional view through one of the trunnions of the valve, taken substantially along line 4—4 in FIGURE 3;

FIGURE 8 is an exploded central sectional view through the mold parts and valve body preparatory to assembly thereof for forming the resilient seat in the valve body;

FIGURE 9 is a fragmentary central sectional view through the assembly of valve body and mold parts with the press of the molding machine removed for clarity of illustration and showing the molding of the resilient seat in the valve body;

The valve chosen to illustrate the invention is one intended for water service in the 150 lb. class, such valves being tested on several times 150 lbs. per square inch. The particular valve chosen is a wafer-type butterfly valve which may be inserted between flanged pipe sections which are bolted together around the annulus of the valve body. The methods employed for placing a resilient seat in the valve chosen for illustration may be followed in making butterfly valves having different types of bodies so as to be usable with pipes having different standard means of connection to the valve. For example, some pipe lines use bolted flanges, others use bell and spigot connections as well as other known connections between pipe sections into which valves may be inserted.

Figure 1:
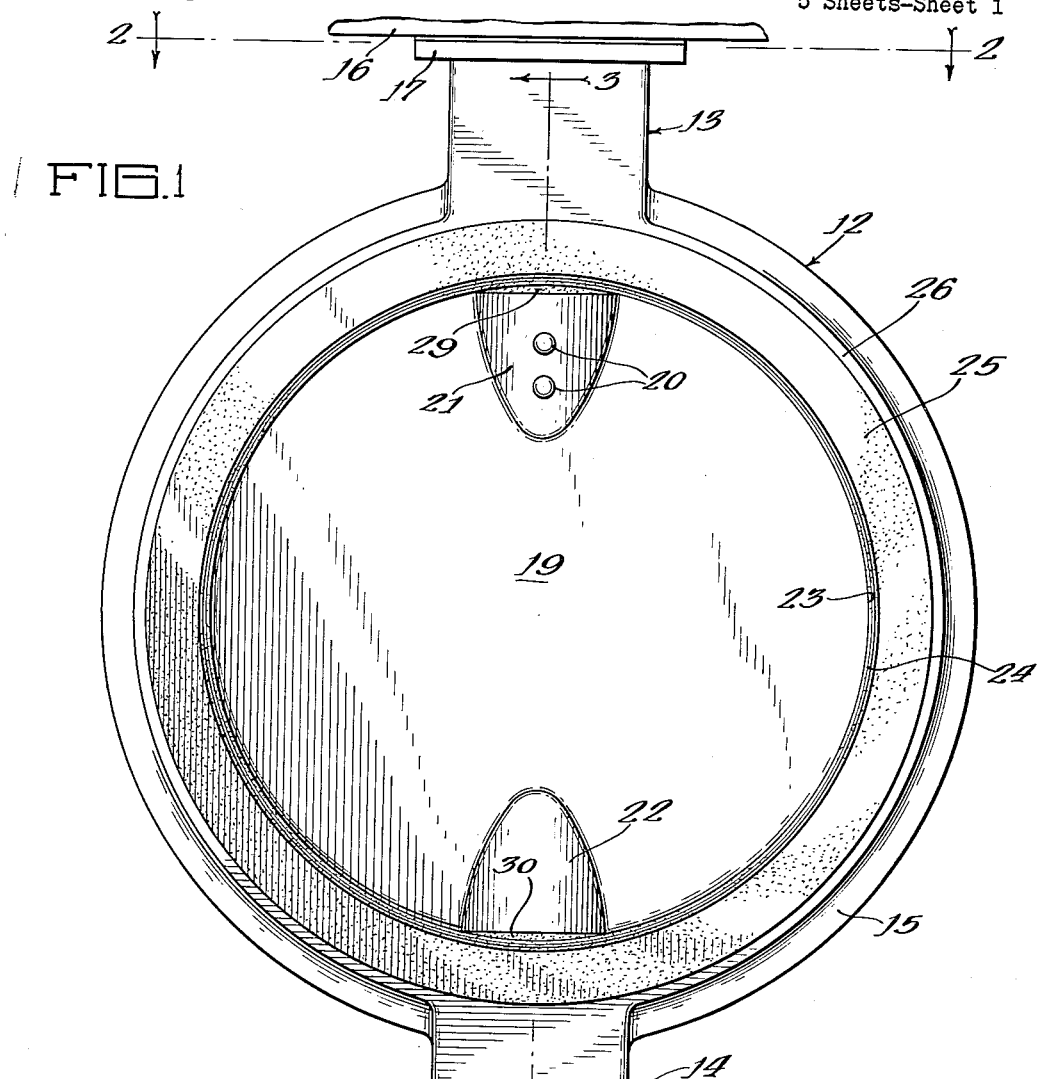
FIGURE 1 is a fragmentary elevational view of a valve made in accordance with the present invention.
Figure 2:
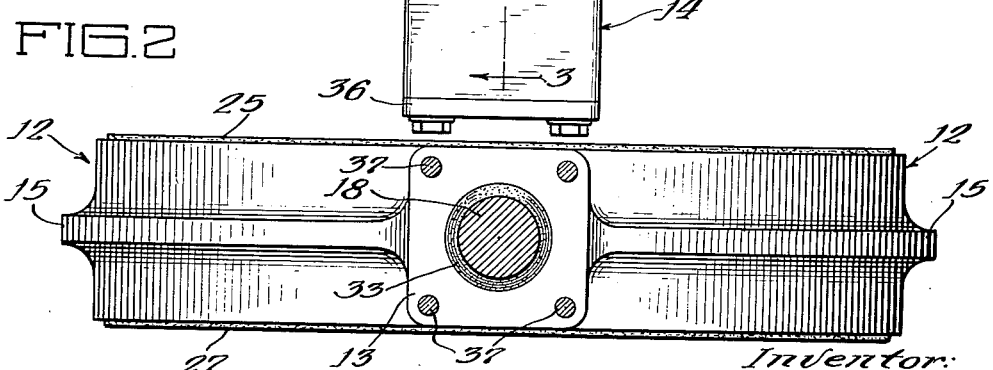
FIGURE 2 is a top plan view partly in section of the valve taken substantially along the line 2—2 in FIGURE 1.

Referring particularly to FIGURES 1 through 4, a completed valve according to the present invention is shown. The valve body generally designated 12 is annular in form with a pair of trunnion bosses 13 and 14 at diametrically opposite sides of the body. A central rib 15 extends around the body between the trunnion bosses. At the upper portion of FIGURES 1 and 3 there is shown the bottom of a valve operator 16 having a plate 17 resting directly upon the upper end of the trunnion boss 13. Such an operator connects directly with the valve shaft 18 extending through the trunnions, through the valve body 12 for connection with the valve disc 19 centered within the housing. Taper pins 20 are ordinarily used to secure the disc 19 to the shaft 18 so that turning of the shaft will cause the disc to turn therewith. The disc is substantially round with a relatively narrow peripheral portion except at the hubs of the disc which surround the shaft 18. At the hubs the disc is enlarged by the bosses 21 and 22, as shown in FIGURES 1 and 3, so as to accommodate the shaft 18. Each side of the disc is somewhat bowed outwardly so that the center of the disc is substantially wider or thicker than the shaft, the shaft passing through the center portion of the disc.

The disc of the valve sealingly engages a resilient seat in the valve body. In FIGURE 1, the outer periphery 23 of the disc is shown in contact with a rubber seat 24. The seat extends through the valve body and over the sides thereof to form a gasket 25 on one face 26 of the valve body and, as shown in FIGURE 3, there is a similar gasket 27 on the opposite face 28. The hubs of the disc ride against the rubber seat which is slightly flattened at surfaces 29 and 30, respectively (FIG- URE 1) so that the hub contacts the seat material, as shown in FIGURE 3.

The shaft 18 passes through the trunnions provided and are surrounded by a sleeve bearing 31 and 32 at opposite ends of the shaft. Each sleeve bearing is preferably formed of nylon sheet material, approximately .030 inch thick. Beyond the sleeve bearings at each end of the shaft is a pressure seal 33 and 34. At the upper end of the valve, the shaft 18 extends through the pressure seal to engage an operator for the valve and at the opposite end, a cap plate 36 is bolted by the bolts 37 to the trunnion boss 14 to enclose the end of the shaft.

In operation, the valve disc 19 rests directly upon the rubber seat 24 and its weight is carried by the seat, there being no thrust bearing on the shaft 18. The plate 36 has a vent 38 to prevent any pressure building up at the end of the valve shaft beyond the pressure seal 34. The valve opens and closes with about 90° of movement. The disc is turned between a position engaging the rubber seat throughout 360° wherein the valve is closed, to an open position 90° displaced therefrom. The periphery of the disc sweeps into and out of contact with the rubber seat, the hubs of the disc remaining in contact with the seat at all times.

One of the advantages of the present invention is that a very accurate seat may be formed centrally in the valve body so that an accurately round valve disc will have complete contact throughout its periphery with the seat material. In the past, seats of a resilient character have generally been separately made and either mechanically or adhesively secured in a machined valve body. Shims and similar procedures and devices were used to fit the seat to the valve disc. The necessity of such fitting of each valve is avoided in the present invention.

Figure 5:
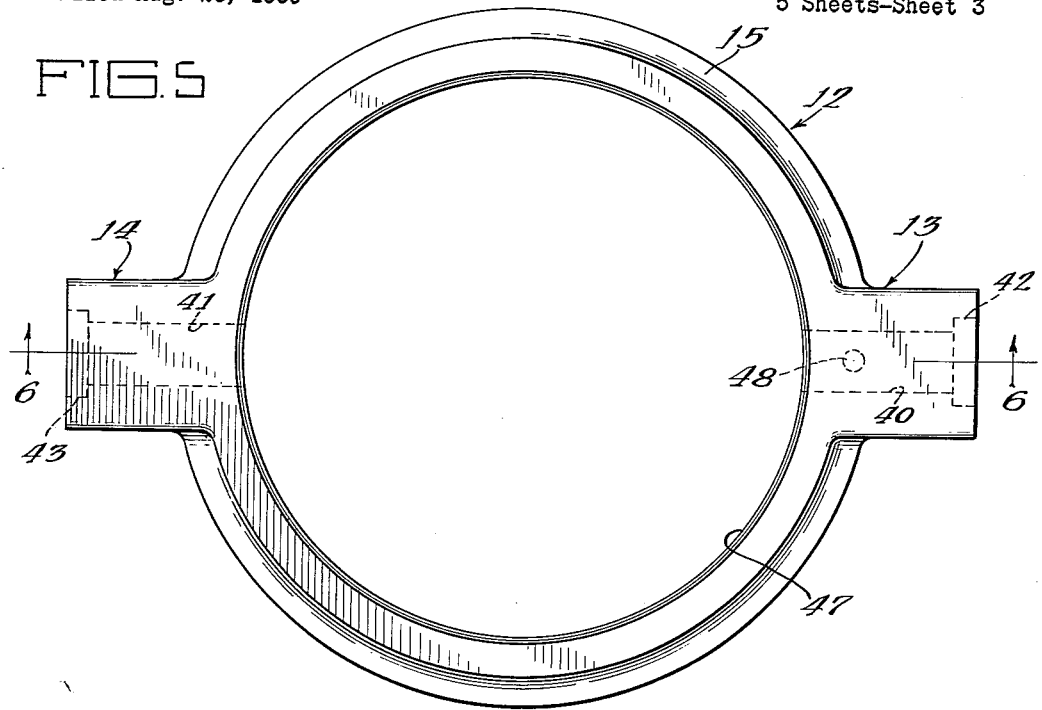
FIGURE 5 is a plan view of the valve body as prepared for receiving the resilient seat.
Figure 6:
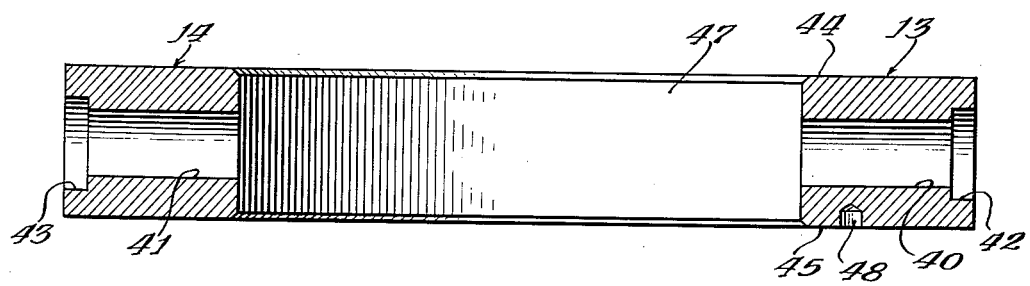
FIGURE 6 is a medial sectional view through the body taken substantially along the line 6—6 in FIGURE 5.
Figure 7:
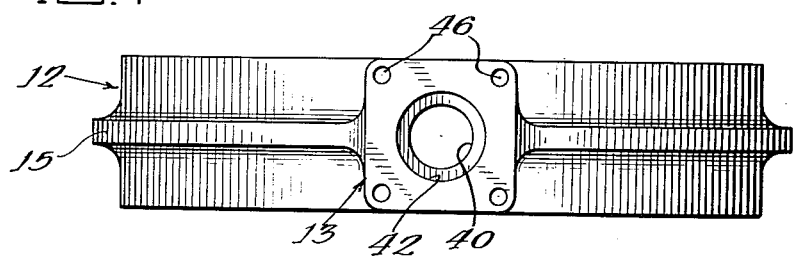
FIGURE 7 is an end elevational view of the body shown in FIGURE 5.

Referring particularly to FIGURES 5 through 7, the valve body for the valve chosen for illustrating the invention is shown as prepared to receive the resilient seat. The body 12 is a cast iron, or other material, member which has very little machining on its surfaces. The casting, as it comes from the mold, may have a cored hole through each trunnion 13 and 14. These cored holes are reamed to provide a smooth bore 40 through the trunnion 13 and a similar smooth bore 41 through the trunnion 14, both bores being accurately centered on a center line through the valve body. Each bore is provided with a counterbore 42, 43, respectively, for receiving the pressure seals about the valve shaft. The face 44 of the valve body is ground flat, its face being uppermost in FIGURE 6. The opposite face 45 is machined with the ground face on a platen so that the machining operation will result in forming a valve body of a given thickness within a relatively close tolerance. Both faces 44 and 45 may be machined to reach the same result. The trunnions are given drilled and tapped openings 46 for the reception of the plate 36 and the valve operator. The described operations are all the machining operations required on the valve body to prepare it for receiving the resilient seat. In addition, the surfaces to which the rubber material is to be bonded are appropriately cleaned to provide a good bond between the rubber and metal. The circular interior surface 47 of the valve is generally a rough cast surface which can and often contains considerable irregularities. The surface is generally cylindrical in form but may vary therefrom due to the casting procedures. These variations will not affect the accuracy of the seat to be formed. The last operation in preparing the valve body is the drilling of a locating hole 48 in the face 46 specifically in the boss 13 extension of that face.

An alternate and presently preferred method of forming the valve body is to give the inner surface 47 a rough machining to insure that the surface is circular cylindrical within a tolerance of the order of plus or minus .010 inch. If this is done, the rubber seat material to be placed in the valve housing may have a more uniform thickness in turn causing a more uniform hardness due to the curing of the rubber along with more uniform shrinkage of the rubber material and a dimensional stability of the seat measured between any diametrically opposite points. If the valve body, as cast, has an inner surface 47 which is circular cylindrical and centered within the body within the tolerances which would be obtained with a machined surface 47, machining operation may be omitted and the advantages thereof will still be obtained.

The placement of the seat material in the valve body is accomplished by using the valve as part of a transfer mold. Referring particularly to FIGURES 8 and 9, the prepared valve body 12a forms a part of a mold, including a lower mold part 50 and an upper mold part 51. A locating pin 52 in mold part 50 is received in the locating hole 48 in the valve body. At the location of the pin, the valve body will be properly positioned on the lower mold 50. Complete orientation of the valve body relative to the mold is obtained by using the reamed openings 40 and 41 in the valve body, inserting plugs 56 and 57 therein, to close the same and provide the desired configuration for the seat material around the valve shaft openings. The assembly of the valve body and mold parts results in the formation of a cavity which may be filled with rubber or rubber-like material to form the valve seat.

In the description of the valve, the seat material has a gasket on either face and the space for the gaskets is provided by annular recesses, such as 58 and 59, in the respective mold parts. The plugs 56 and 57 have a smaller diameter portion 56a and 57a, respectively, which enters the enlarged portions 54a of the cross bore in the lower mold parts in order to form a ring 60 of rubber material in the bores of the trunnions of the valve. This ring 60 will form a seal against the valve shaft when the shaft is inserted within the ring as assembled and illustrated in FIGURE 3. As illustrated in FIGURE 9, the assembly may be completed by threaded rod 61 which holds the plugs bottomed against the lower mold part, and the inner part of the plugs in the mold part accurately centers the valve body relative to the mold parts. The upper mold part 51 closes the cavity for receiving the rubber and a ring 62 thereon with bronze bearing rings 62a and 62b is intended to enter the space above the seat cavity to transfer an accurately measured amount of rubber into the cavity. The lower surface 63 is shaped to form the one side of the seat as illustrated. The mold parts contact with the valve body in metal-to-metal contact at the extremities of the cavity formed for the rubber material. The cavity being filled with the rubber material forms a homogeneous valve seat within the valve body.

The techniques of transferring a rubber material into a mold cavity and curing the same under heat and pressure are known. In the present invention, the mold parts are treated so that the rubber material will not adhere thereto. The rubber is cured in the mold, it being understood that suitable presses are used to apply pressure to the assembly of mold parts and mold body. Once the rubber material is cured, the mold is disassembled and the valve body removed.

Figure 10:
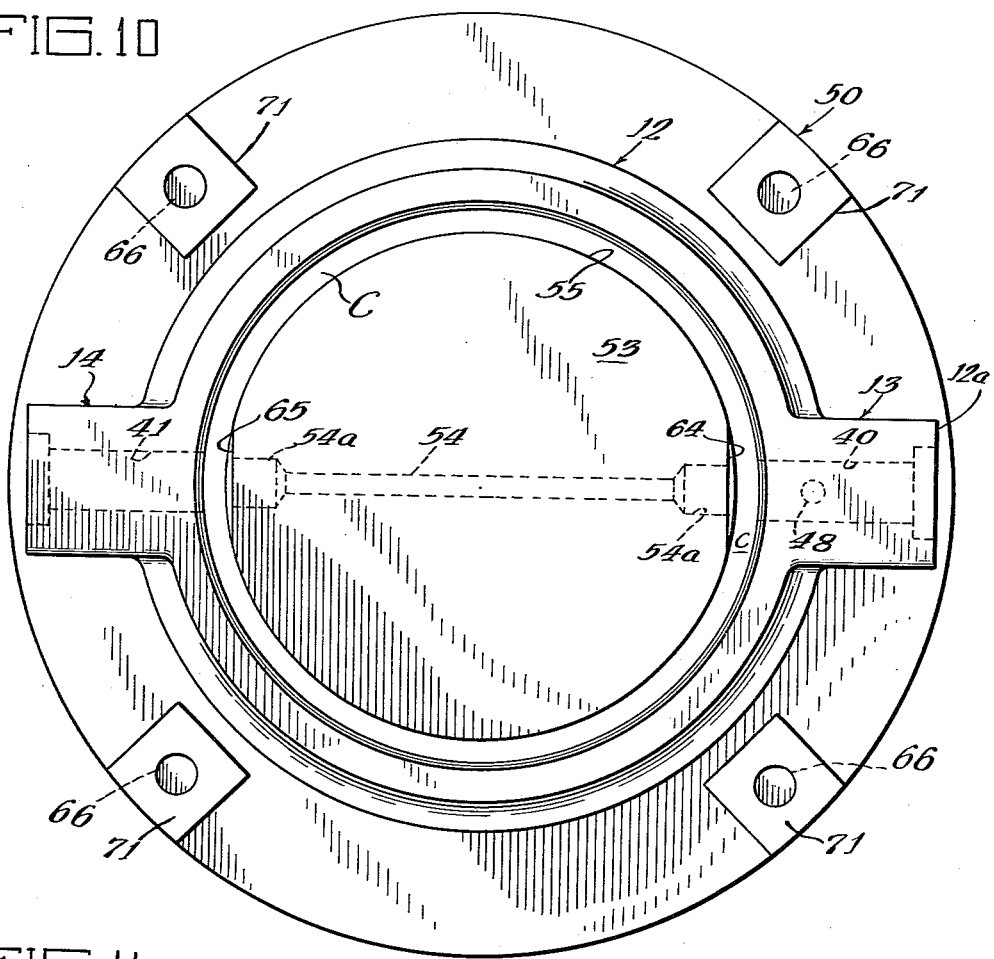
FIGURE 10 is a plan view of the assembly shown in FIGURE 9 with the top mold part removed, the figure showing the cavity for receiving the resilient material.

Referring particularly to FIGURE 10, the central upstanding portion 53 of the lower mold is shown as having its smooth outer surface 55 slightly flattened at 64 and 65 to provide the flat areas for the hubs of the valve discs. The cavity C between the valve body and upstanding portion 53 of the mold is also visible. Pins 66 received in upstanding standards 71 on the lower mold part hold an upper ring plate 67 in proper position relative to the upper and lower mold portions. The raw rubber is placed between the upstanding central part 53 of the lower mold part and the ring plate 67 just prior to transfer into the cavity C. In assembly, the valve body is placed in position after which the rubber is inserted followed by the upper mold part.

Figure 11:
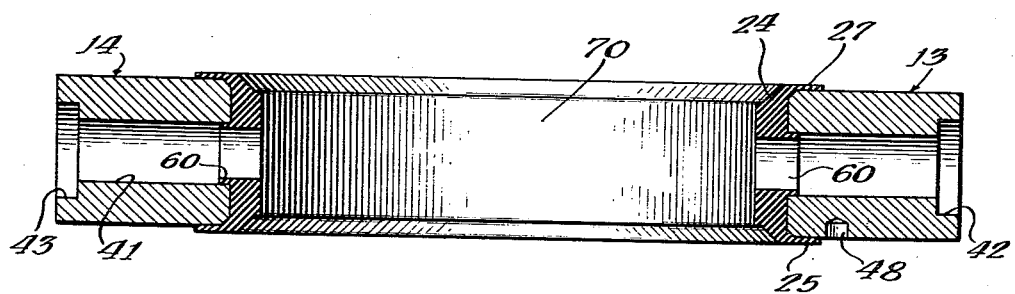
FIGURE 11 is a finished valve body with the resilient seat therein as removed from the mold.

The finished valve housing ready to receive the disc, valve shaft, bearings and seals, is illustrated in FIGURE 11. The inner surface 70 of the valve seat 24 is perfectly smooth and corresponds in contour to the surface 55 of the mold. It is accurately centered within the valve housing irrespective of any irregularities or roughness or variations in the rough cast valve body. The thickness of the valve seat measured radially will be non-uniform, because the outer surface of the valve seat intimately follows the rough cast housing and is bonded thereto. The inner working surface, however, is quite smooth so that an accurately formed disc will have sealing contact with the seat throughout 360°.

Referring again to FIGURE 3, the assembly is made by simply inserting a sleeve of nylon sheet or other bearing material to form the sleeve bearings 31 and 32, the disc placed in the valve after which the shaft is inserted and pinned to the disc. The pressure seals may be of various forms and are thereafter inserted at the ends of the shaft after which the plate 36 and valve operator 16 are assembled on the ends of the housing.

Where care has been exercised in the manufacture of the valve housing so that the rubber seat has a substantially uniform thickness and hardness, the valve disc may be separately manufactured so as to have a minimum interference with the seat surface. The uniformity of the seat permits much less interference than would otherwise be possible. The immediate advantage is that the amount of torque needed to turn the disc in the valve is much less because of the less interference, yet complete 360° of sealing between the disc is obtained with each valve coming from the assembly line.

The valve is then ready for shipment and requires no fitting or handwork to insure proper operation under working pressures. It has been found that the valve of the present invention may be manufactured in the manner outlined so that the valve is fully competitive with gate valves and other valves used extensively in water service.

The foregoing detailed description has been given for clearness of understanding only, and no unnecessary limitations are to be understood therefrom for some modifications will be obvious to those skilled in the art.

I claim:

1. Apparatus for forming a resilient valve seat in a valve body, comprising: a base, a male mold member on the base having machined openings extending laterally of the base, a pivot pin on the base beside the male mold member, a valve body resting on the base about the male mold member and having machined openings therein, said valve body having means receiving said pivot pin pivoting the body relative to said base for aligning the machined openings in the male mold member and the valve body, pin members engaging said aligned machined openings to lock the valve body in position relative to the base with a cavity for a resilient seat between the valve body and male mold member, and a closure engaging the valve body and male mold member for closing said cavity.

2. Apparatus as specified in claim 1 wherein each locking pin has an inner end engaging the male mold member limiting inner movement of the pin and each locking pin further has a portion within and spaced radially inwardly from the machined opening in said valve body to provide space for a ring of resilient seat material within said machined openings in the valve body.

3. Apparatus for forming a resilient valve seat in a valve body, comprising: a base, a male mold member on the base having opposite machined openings extending laterally of the base and on a common centerline, a valve body resting on the base about the male mold member, cooperating means on the base and valve body pivoting the valve body relative to the base for swinging the valve body relative to the male mold member, said valve body having opposite machined openings therein respectively aligned with said machined openings in said male mold member when the valve body is pivoted to proper position relative to the base and male mold member, pin members engaging the aligned machined openings locking said valve body in position relative to the base and male mold member with a cavity between the valve body and male mold member for resilient valve seat material, and a closure engaging the valve body and male mold member closing said cavity.

4. Apparatus as specified in claim 3 wherein the pin members each have a first cylindrical outer surface engaging the machined opening in the valve body and a second smaller cylindrical outer surface engaging the machined opening in the male mold member with a shoulder between said surfaces, said shoulder being positioned within said machined opening in the valve body to provide a ring-shaped space within the valve body machined opening to receive resilient material.

5. Apparatus as specified in claim 3 wherein the machined openings in the male mold member are connected with a passage extending laterally through the male mold member and a rod connects said locking pins to hold the male mold member and valve body in said aligned assembly.

6. Apparatus as specified in claim 3 wherein the valve body has an opening in one face and said base has an upstanding pivot pin receivable in said opening, said pivot pin having its center in alignment with said common centerline of said machined openings whereby the position of the valve body relative to the male mold member in the direction of said common centerline is predetermined.

7. The method of aligning a valve body relative to a mold for forming a resilient valve seat in the body, comprising the steps of assembling a valve body against a base support so as to extend around an upstanding male mold member on the base support, pivoting the valve body to the base support so that the valve body may pivot on the base support relative to the upstanding male mold member, swinging the valve body on said pivot to a position of alignment of machined openings in the valve body with machined openings in the male mold member, and locking the valve body in said position by insertion of locking pins in said aligned machined openings securing the valve body about the male mold member with a cavity therebetween to receive resilient seat material.

8. The method of aligning a valve body relative to a mold for forming a resilient valve seat in the body, comprising the steps of placing a valve body about a male mold member so as to rest upon a base support for the male mold member, pivoting the valve body relative to the base support so that the valve body may swing relative to the male mold member, swinging the valve body about said pivot to bring machined openings in the valve body into alignment with machined openings in the male mold member, then inserting locking pins into the aligned machined openings so that the pins bear simultaneously upon both the machined openings in the valve body and male mold member to lock the valve body in position relative to the base support and male mold member with a proper cavity therebetween for reception of resilient seat material, and closing the cavity between the valve body and male mold member so that said seat material may be placed therein.

9. The method of aligning a valve body relative to a mold for molding a resilient valve seat within the body, comprising the steps of, placing a valve body about a male mold member so as to be supported upon a base support for the male mold member with the valve body extending around the male mold member in spaced relation therewith providing a cavity therebetween, pivoting the valve body upon the base support so that the valve body may swing over the base support relative to the male mold member, swinging the valve body on said pivot to bring accurately machined surfaces in the male mold member and valve body into alignment on a common centerline, locking the valve body in said position of alignment by means engaging the aligned accurate machined openings, said locking means securing the valve body in fixed position relative to the base support and male mold member so that the inner surface of said cavity therebetween is the outer surface of the male mold member accurately positioned relative to the machined openings in the valve body, and closing the cavity between the valve body and male mold member preparatory to the placement of resilient valve seat material within the cavity.

References Cited in the file of this patent

UNITED STATES PATENTS

| | | |
|---|---|---|
| 1,894,644 | Sturdevant | Jan. 17, 1933 |
| 1,977,351 | Phillips | Oct. 16, 1934 |
| 2,468,239 | Saulino | Apr. 26, 1949 |
| 2,554,008 | Burger | May 22, 1951 |
| 2,644,199 | Miller | July 7, 1953 |
| 2,769,203 | Wood | Nov. 6, 1956 |
| 2,923,524 | Fawkes | Feb. 2, 1960 |
| 2,961,214 | Freed | Nov. 22, 1960 |

FOREIGN PATENTS

| | | |
|---|---|---|
| 11,664 | Great Britain | Oct. 20, 1910 |